Sept. 15, 1964    E. H. BATUR ETAL    3,148,921
ENDLESS TRACK CHAIN AND LINK
Filed June 11, 1962    2 Sheets-Sheet 1
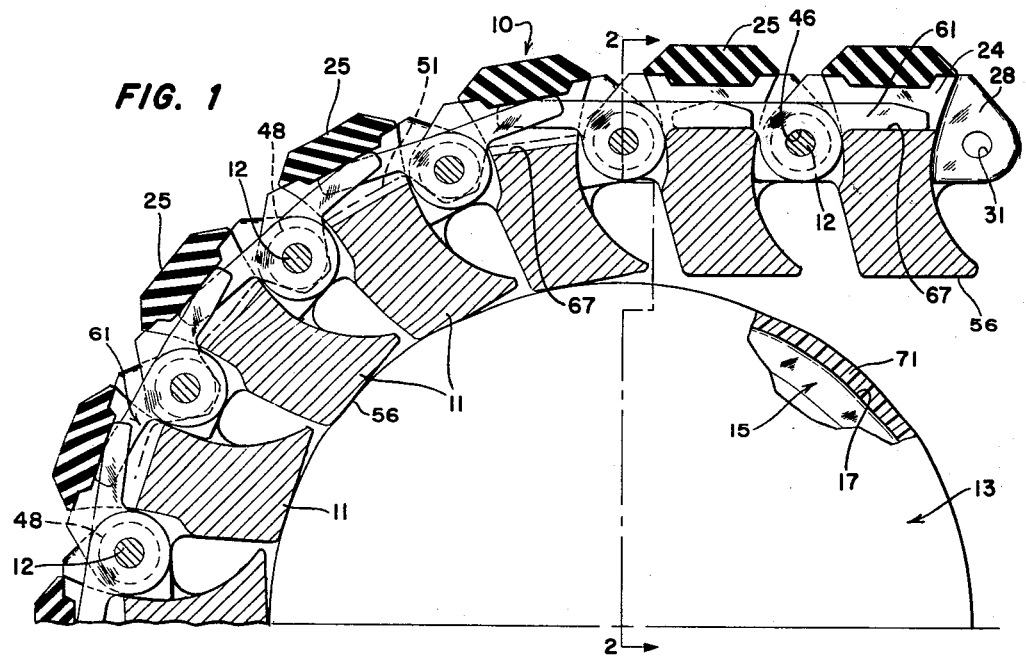
FIG. 1
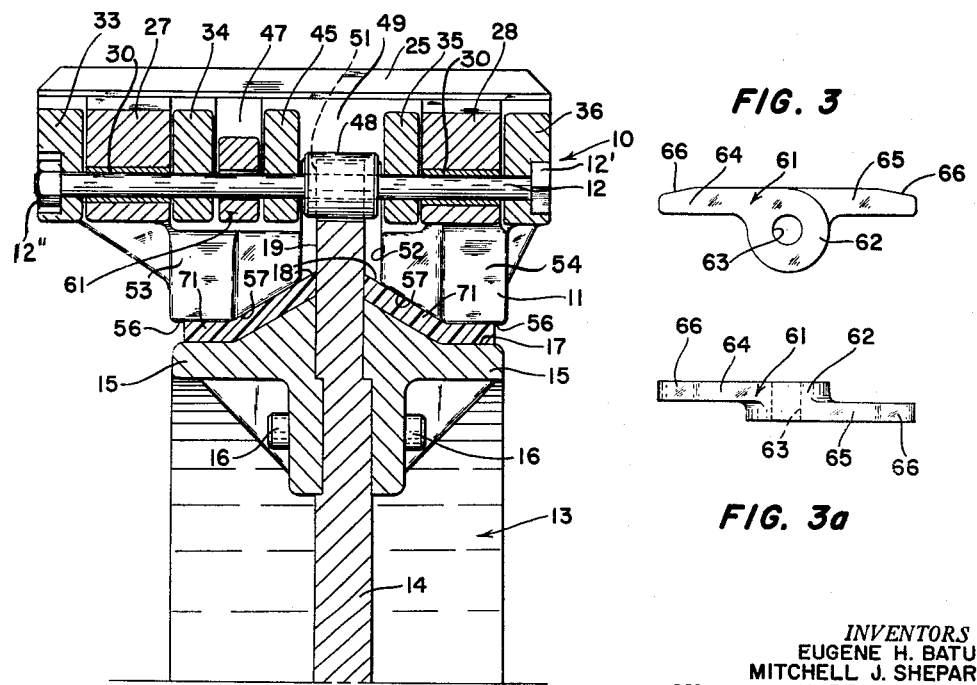
FIG. 2
FIG. 3
FIG. 3a
INVENTORS
EUGENE H. BATUR
MITCHELL J. SHEPARD
HUBERT C. MUSIL
AUGUST T. GONIA
BY Strauch, Nolan & Neale
ATTORNEYS Sept. 15, 1964   E. H. BATUR ETAL   3,148,921
ENDLESS TRACK CHAIN AND LINK
Filed June 11, 1962   2 Sheets-Sheet 2

INVENTORS
EUGENE H. BATUR
MITCHELL J. SHEPARD
HUBERT C. MUSIL
AUGUST T. GONIA
BY Strauch, Nolan & Neale
ATTORNEYS United States Patent Office 3,148,921
Patented Sept. 15, 1964

3,148,921
ENDLESS TRACK CHAIN AND LINK
Eugene H. Batur, La Grange, Mitchell J. Shepard, Hinsdale, Hubert C. Musil, Berwyn, and August T. Gonia, Western Springs, Ill., assignors to Rockwell-Standard Corporation, Coraopolis, Pa., a corporation of Pennsylvania
Filed June 11, 1962, Ser. No. 201,632
16 Claims. (Cl. 305—35)

This invention refers to endless track assemblies for vehicles and more particularly to improved link construction and connections.

In known endless traction chain assemblies for half-tracks, tanks and the like, separate traction members, identified as shoes, are usually pivotally interconnected either directly to each other of by linkage to hold them together and attempt to provide a certain degree of stability to the chain. Most of such multi-pivoted traction chain assemblies known today are extremely noisy in operation, so subject to wear as to require a great deal of maintenance and difficult to assemble and disassemble, which later is of great importance, for instance, in regard to so-called half-track tractors where interchangeability may be incident to normal operation for conversion between the endless track to ordinary road wheels and tires to suit operating conditions. Most of these prior conventional track assemblies are furthermore costly and of excessive weight.

To overcome the aforesaid disadvantages of these conventional traction chain assemblies, the present invention provides a lightweight traction chain composed of a number of identical shoes, with adjacent shoes pivotally connected together at one point only and which incorporates special means for rigid support and load distribution to assure smooth and substantially noiseless operation. This incorporates some of the features of invention disclosed in our pending application Serial No. 50,278, filed August 17, 1960, now abandoned, of which the present is a continuation-in-part.

Accordingly, the principal object of the present invention is the provision of a novel endless traction chain shoe of relatively simple but unique construction and provided with rubber treads on the outer surface and an inner surface constituting a radial bearing surface.

Another object of this invention is the provision of a novel endless traction chain assembly incorporating special locking links pivotally mounted on the pivot connecting adjacent shoes.

Still another object of the invention is to provide a novel traction chain assembly incorporating a sprocket wheel having chain supporting guides attached thereto covered with hard tough plastic cushion material to provide smooth noiseless support for the moving pivoted shoes of the chain, and sprocket engaged rollers rotatably supported on the shoes on the same pivots as the locking links and adjacent shoes.

A further object of the invention is to provide a novel traction chain assembly having a minimum of pivoted parts constructed and arranged in such way as to provide a maximum amount of rigidity and stability to the chain and prevent any excessive slack and lateral shoe displacement.

A further object of the invention is to provide a shoe of novel construction for an endless traction chain assembly.

Other objects and novel features will become more clearly apparant by the following detailed description in connection with the appended drawings wherein:

FIGURE 1 is a fragmentary view in longitudinal section through a portion of a traction chain assembly according to a preferred embodiment of the present invention;

FIGURE 2 is a tranverse section substantially along line 2—2 of FIGURE 1;

FIGURES 3 and 3a are end and top views respectively of the locking link;

Figure 4:
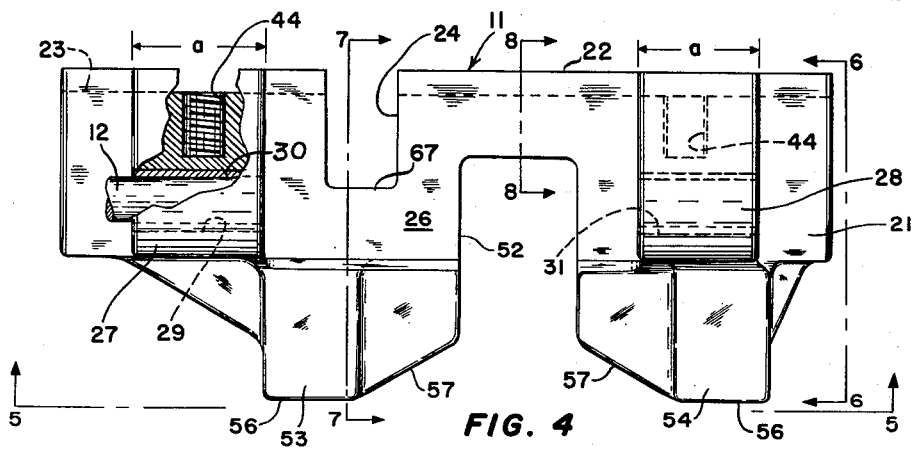
FIGURE 4 is an enlarged elevational view partially broken away and in section showing one side of the traction shoe.

As illustrated in FIGURES 1 and 2 the traction assembly of the invention comprises an endless chain 10 made up of a series of similar shoes 11 that are pivotally interconnected by pins 12.

The endless chain 10 passes over at least two similar wheel assemblies 13, only one of which is shown, each comprising a sprocket wheel 14 rotatable about a horizontal axis. Similar annular drums or rims 15 are secured to sprocket wheel 14 radially inwardly of the sprocket teeth, as by bolts 16.

Rims 15 have coaxial cylindrical outer surfaces 17 of the same diameter and coaxial with sprocket wheel 14. The inner surfaces 18 of rims 15 continue symmertically conically to intersection with the vertical sides 19 of sprocket wheel 14.

Either or both wheel assemblies 13 may be rotatably driven from the vehicle power plant (not shown) by conventional drive gearing.

The chain shoes 11 are preferably all similar and shown in detail in FIGURES 4–8, and the description of one will suffice for all.

Each shoe 11 comprises an integral metal body 21 of complex shape having its outer surface 22 formed with a straight channel 23 that is interrupted only by a deep body recess 24 (FIGURE 4) and receives a shaped rubber tread block 25 suitably fixed to body 21. The treads 25 are parallel and extend transversely in the chain assembly and provide increased ground traction with attendant reduction of noise and wear in the assemly.

Figure 5:
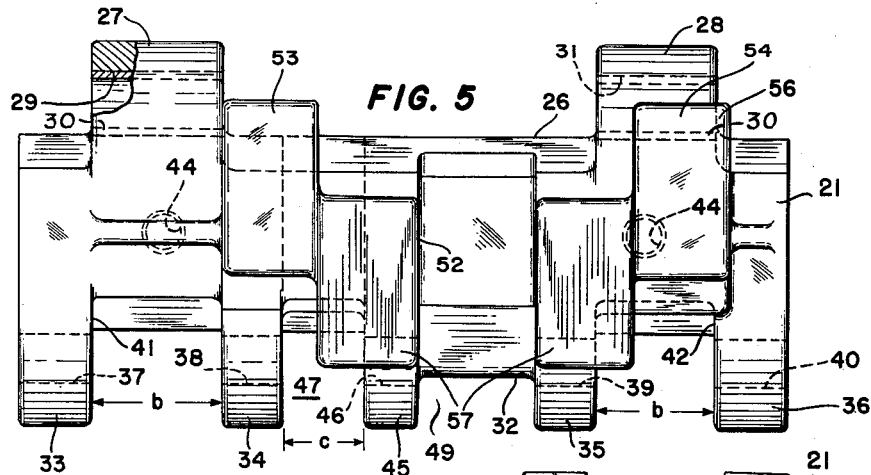
FIGURE 5 is a bottom plan view substantially along line 5—5 of FIGURE 4 showing the traction shoe in further detail.

As shown in FIGURES 4 and 5 shoe bodies 21 are elongated transversely of the chain assembly. At one side 26 of body 21 a pair of identical flate-sided ears 27 and 28 project outwardly. These ears 27 and 28 are of the same size and are spaced the same distance inwardly from opposite ends of the body. Ears 27 and 28 are formed with axially aligned similar bores 29 and 31, respectively, with the flat sides of the ears being perpendicular to the common axis of the bores.

At the other side 32 (FIGURE 5) of body 21 two pairs of spaced flat-sided ears 33, 34 and 35, 36 project outwardly. These ears 33–36 are of about the same size except that the outer end ears 33 and 36 may be slightly wider, and all are preferably narrower than ears 27 and 28. Ears 33–36 are formed with axially aligned bores 37–40, respectively, and the flat sides of the ears are perpendicular to the common axis of these bores.

In the chain assembly the ear 27 of each shoe extends into the recess 41 between ears 33 and 34 of the adjacent shoe, and the ear 28 extends into the recess 42 between ears 35 and 36 of that adjacent shoe, and all of the bores 29, 31 and 37–40 are aligned to receive the pivot pin 12 which extends through all of them. Pin 12 which is cylindrical is rotatable in steel bushings 30 which line bores 29 and 31. Pin 12 is suitably non-rotatably anchored in bores 37, 38, 46, 39 and 40.

As shown in FIGURE 2, pin 12 preferably has a non-circular, usually square head 12' seated in a correspondingly shaped recess in ear 36, and at the other side pin 12 is threaded to receive a nut 12" disposed in an outer side recess of ear 33. Internal keys (not shown) may be used to non-rotatably connect the ears 33, 34, 45, 35 and 36 to pin 12.

The width of ears 27 and 28, represented at $a$ in FIGURE 4 is just slightly less than the width $b$ of recesses 41 and 42 so that the flat sides of the ears will be in smooth relatively slidably rotative engagement and the adjacent shoes will flex freely and smoothly about the pivot pins 12 with no relative lateral displacement or binding. Suitable fastener receiving recesses 44 are provided for attaching cleats 25 to the shoes.

A flat-sided ear 45 similar to narrower ears 34 and 35 also projects outwardly from shoe body side 32 and has a bore 46 through which pivot pin 12 passes. Ears 34 and 45 are spaced a distance $c$ apart equal to the width of recess 24 at the top of the shoe, and in fact the space 47 between ears 34 and 35 is essentially a downward continuation of one end of recess 24.

Referring to FIGURE 2, a cylindrical roller 48 is freely rotatably mounted on pivot pin 12 in the space 49 between ears 35 and 45. In the assembly rollers 48 engage in drive relation the sides of teeth 51 of the sprocket wheel 14. As shown in FIGURE 4 a deep flat sided recess 52 is formed in body 21, and as shown in FIGURE 5 this recess 52 continues up at link side 32 to merge into space 49. Thus space 49 and recess 52 accommodate the sprocket wheel periphery.

Figures 6, 7, 8:
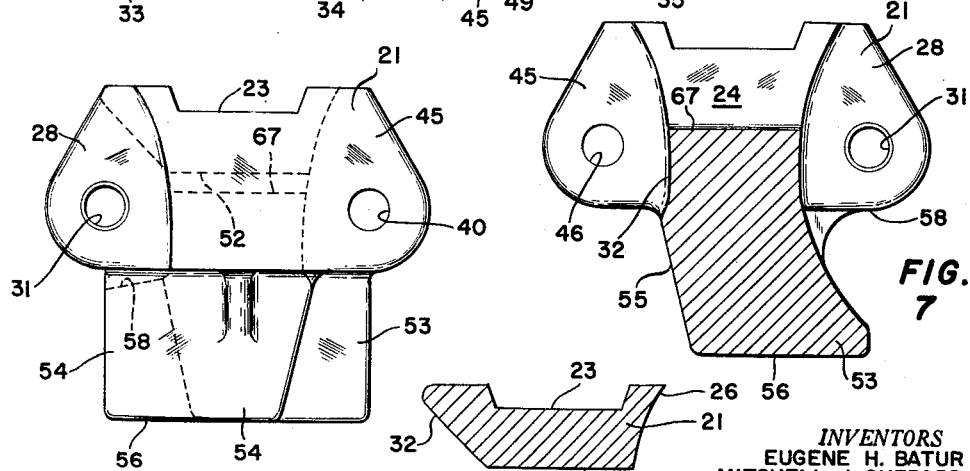
FIGURE 6 is an end view of the traction shoe looking in the direction of line 6—6 of FIGURE 4.
FIGURE 7 is a section along line 7—7 of FIGURE 4 showing details of traction shoe structure.
FIGURE 8 is a section along line 8—8 of FIGURE 4 showing further detail of the traction shoe.

As shown in FIGURE 4 the link body has legs 53 and 54 projecting downwardly at opposite sides of the sprocket wheel receiving recess 52. In the assembly (FIGURE 2) these legs are symmetrically located on opposite sides of the sprocket wheel 14. As shown in FIGURE 7, the side 32 of both legs 53 and 54 is inclined at 55 to clear the adjacent shoe during passage over the wheel assemblies.

Also as shown in FIGURES 2 and 4, each shoe leg has a straight outer bottom surface 56 parallel to pivot pin 12 and an upwardly and inwardly inclined surface 57 extending from the inner edge of surface 56 to intersect recess 52.

A side recess 58 is provided in the shoe body between the ears 27 and 28 to provide pivoting space for the ears of the adjacent shoe 11.

Mounted on each pivot pin 12 in link space 47 is a link 61 shown apart from the assembly in FIGURES 3 and 3a. Each link 61 is a rigid integral unit consisting of a central hub 62 having a bore 63 and oppositely extending laterally offset arms 64 and 65. The outer ends of arms 64 and 65 have inclined flat surfaces 66. Each link 61 is freely rockably mounted on pivot pin 12.

In the chain assembly each link 61 in the straight portion of the chain between the drive wheels is disposed with the flat bottoms of its opposite arms 64 and 65 in engagement with the flat bottom surfaces 67 of adjacent shoes recesses 24. The offset arms of the link thus permit two oppositely extending link arms to lie in each recess 24. Thus, each link 61 spans two adjacent shoes in the assembly and this prevents slackening or sagging of the chain 10 in the straight sections between the wheels which eliminates excessive noise and vibration. Also since the opposed link arms in each recess abut laterally this resists lateral displacement of the chain shoes and adds rigidity and stability to the assembly.

In the assembly and during operation, as the chain 10 passes over the wheel assembly 13 counterclockwise in FIGURE 1, it will be seen that the shoes 11 will be rocked successively relatively to each other about pivots 12 due to the slidable engagement of shoe leg surfaces 56, 57 with the wheel drums 15. During this time the associated links 61 will freely rock about pivots 12 with their flat beveled outer end surfaces 66 tightly engaging the undersides of rubber track treads 25 where those treads bridge recesses 24. In effect, the links 61 assume an attitude substantially tangential to the wheel assembly 13 as they move around the wheel assembly. This provides tension on the portion of the chain 10 passing around the wheel assembly tending to maintain a constant radius around the drums 15 and increases the rigidity of the chain and the stability, silence and traction effort of the drive.

To assure more quiet operation and as added wear resistance, the outer peripheral surfaces of the drums 15 in each wheel assembly may be covered with a uniform smooth layer of hard, tough oil and water resistant plastic material 71, such as neoprene or neothane, as illustrated in FIGURE 2, providing sliding engagement with shoes 11. This sound deadening layer 71 may be of any suitable thickness and it is preferably rigid with drums 15.

It will be further seen from FIGURE 2 that shoes 11 are supported on the wheel assemblies solely by their leg portions 53 and 54 which straddle the sprocket wheel 14, so that no undesirable loads are transferred to the roller 48, link 61 or pivot pin 12. This increases the chain life materially.

The present structure is of simple design embodying a minimum number of relatively movable parts and an absolute minimum of pivot connections. Each pair of adjacent shoes, and their associated link and sprocket engaging roller are supported on the same pivot pin, thus facilitating assembly and disassembly and reducing maintenance. Noise and chatter is kept at the lowest possible level and adequate rigidity is provided at any position of the chain. To reduce the weight of the assembly shoes 11 may be made of aluminum.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an endless track assembly of the type characterized by an endless chain passing over drive wheel assemblies with said chain having substantially straight sections between the wheel assemblies and flexing around the wheel assemblies, at least one of said wheel assemblies comprising a toothed sprocket and having similar oppositely axially extending chain guide supports disposed radially inward of the sprocket teeth, and said chain comprising a series of similar shoes straddling said sprocket with inwardly extending legs for slidably engaging said supports, pivot means interconnecting adjacent shoes, rollers on said pivot means operatively engaged with the sprocket teeth, and rigid locking links intermediately rockably mounted on said pivot means having oppositely extending arms extending into engagement with the adjacent shoes.

2. In the endless track assembly defined in claim 1, said pivot means being disposed adjacent the outer portions of said shoes and said link arms laterally overlapping in the respective shoes.

3. In the endless track assembly defined in claim 1, said chain guide supports comprising drums having inner conical peripheral surfaces adjacent the sprocket and outer cylindrical peripheral surfaces, and said shoe legs being correspondingly shaped.

4. In the endless track assembly defined in claim 1, a smooth cushion layer of hard tough plastic on said guide support peripheral surfaces directly engaged by said shoe legs.

5. In an endless track assembly of the type characterized by an endless chain passing over drive wheel assemblies with said chain having substantially straight sections between the wheel assemblies and flexing around the wheel assemblies, at least one of said wheel assemblies comprising a toothed sprocket and having similar oppositely axially extending chain guide drums disposed radially inward of the sprocket teeth, and said chain comprising a series of identical shoes straddling said sprocket with inwardly extending legs for slidably engaging said drums, pivot pins interconnecting adjacent shoes adjacent the outer portions of said shoes, rollers on said pivot pins operatively engaged with the sprocket teeth, and rigid locking links rotatably mounted on said pivot pins and having oppositely extending arms extending into engagement with the adjacent shoes.

6. In the endless track assembly defined in claim 5, each said shoe having a laterally and outwardly open recess for receiving said link arms, and a transverse tread member mounted on each shoe bridging said recess.

7. In the endless track assembly defined in claim 6, each said shoe having a transversely spaced pair of ears on one side, said ears projecting into the spaces between different transversely spaced pairs of ears on the other side of the adjacent shoe, said pivot pins passing through all of said ears, and each said roller and link being mounted on a pivot pin between adjacent pairs of ears.

8. In an endless track assembly of the type characterized by an endless chain passing over drive wheel assemblies with said chain having substantially straight sections between the wheel assemblies and flexing around the wheel assemblies, at least one of said wheel assemblies comprising a toothed sprocket and having similar oppositely axially extending chain guide supports disposed radially inward of the sprocket teeth, and said chain comprising a series of similar shoes straddling said sprocket with inwardly extending legs for slidably engaging said supports, pivot means interconnecting adjacent shoes, rollers on said pivot means operatively engaged with the sprocket teeth, and rigid locking links on said pivot means having oppositely extending arms extending freely into aligned through recesses in the adjacent shoes.

9. In the endless track assembly defined in claim 8, said recesses being outwardly open and bridged by transverse tread elements secured to the shoes.

10. In the endless track assembly defined in claim 8, the oppositely extending link arms in each said shoe recess being relatively offset and in substantial lateral abutment.

11. A shoe for an endless traction chain assembly comprising an integral metal body having an intermediate sprocket wheel receiving recess opening to one peripheral surface and a locking link arm receiving recess opening laterally and to an opposite peripheral surface, means defining a tread mounting recess in said opposite peripheral surface, and spaced pairs of ears projecting from opposite sides of said body, all of said ears on each side being formed to receive a common pivot pin, and spaced drum engaging legs on said body projecting from said one surface at opposite sides of said sprocket wheel receiving recess, said legs extending substantially at right angles to the directions of projection of said ears from the body.

12. The shoe defined in claim 11, wherein said legs have inclined inner bearing surfaces diverging from said sprocket wheel receiving recess and merging into outer cylindrical bearing surfaces.

13. In an endless track assembly of the type characterized by an endless chain passing over drive wheel assemblies with said chain having substantially straight sections between the wheel assemblies and flexing around the wheel assemblies, at least one of said wheel assemblies comprising a toothed sprocket and having similar oppositely axially extending chain guide supports disposed radially inward of the sprocket teeth, and said chain comprising a series of similar shoes straddling said sprocket with inwardly extending legs for slidably engaging said supports, said shoes having through recesses that are aligned in the direction of movement of said chain, pivot means interconnecting adjacent shoes, rollers on said pivot means operatively engaged with the sprocket teeth, and rigid locking links freely rockably mounted on said pivot means having oppositely extending laterally offset arms extending freely into the recesses of adjacent shoes.

14. In the endless track assembly defined in claim 13, said pivot means being a pin, and said links each having an intermediate hub journaled on said pin and offset arms projecting oppositely from the hub into the recesses of adjacent shoes.

15. In the endless track assembly defined in claim 14, said recesses being outwardly open and bridged by cushion tread elements secured across the shoes, and said links rocking to engage said tread elements during passage of the chain over a wheel assembly.

16. In an endless track assembly of the type characterized by an endless chain passing over one or more drive wheel assemblies with said chain having substantially straight sections between the wheel assemblies and flexing around the wheel assemblies, at least one of said wheel assemblies comprising a toothed sprocket and having similar oppositely axially extending chain guide supports disposed radially inward of the sprocket teeth, and said chain comprising a series of similar shoes straddling said sprocket with inwardly extending legs for slidably engaging said supports, said shoes having through recesses that are aligned in the direction of movement of said chain, flexible tread members on each shoe transversely extending across each said recess, pivot means interconnecting the outer portions of adjacent shoes, rollers on said pivot means for engaging the sprocket teeth, and rigid locking link means rockably mounted on said pivot means and having opposite arms freely extending into said recesses, said link means rocking during passage of the chain around said sprocket to urge said arms against the underside of said treads for increasing the ground engaging tractions of said treads.

References Cited in the file of this patent

UNITED STATES PATENTS

| | | |
|---|---|---|
| 2,003,528 | Best | June 4, 1935 |
| 2,199,292 | Pierce | Apr. 30, 1940 |
| 2,383,184 | Frederickson | Apr. 21, 1945 |
| 2,967,075 | Christie | Jan. 3, 1961 |
| 3,056,633 | Lucas et al. | Oct. 2, 1962 |